(12) United States Patent
Jeon et al.

(10) Patent No.: US 7,408,982 B2
(45) Date of Patent: Aug. 5, 2008

(54) EQUALIZER FOR HIGH DEFINITION TELEVISION AND EQUALIZATION METHOD THEREOF

(75) Inventors: Hyun-Bae Jeon, Seoul (KR); Dong-Seog Han, Daegu Metropolitan (KR); Hae-Sock Oh, Daegu Metropolitan (KR); Ju-Yeun Kim, Daegu Metropolitan (KR); Do-Jun Rhee, Yongin (KR); Ji-Sun Shin, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 795 days.

(21) Appl. No.: 10/425,837

(22) Filed: Apr. 30, 2003

(65) Prior Publication Data

US 2004/0032529 A1  Feb. 19, 2004

(30) Foreign Application Priority Data

Aug. 16, 2002 (KR) ............................... 2002-48402

(51) Int. Cl.
*H03H 7/30* (2006.01)
(52) U.S. Cl. ...................... 375/231; 375/232
(58) Field of Classification Search ......... 375/229–234, 375/348, 349, 350, 259–262, 265, 316, 340, 375/341; 708/100, 200, 300, 322, 323; 704/200, 704/231, 236, 242; 714/699, 746, 786, 792; 348/611, 571, 607, 608
See application file for complete search history.

(56) References Cited

U.S. PATENT DOCUMENTS 4,995,057 A * 2/1991 Chung ........................ 375/231
5,214,391 A * 5/1993 Serizawa et al. ............ 329/316
5,886,748 A * 3/1999 Lee ............................. 348/614
6,515,713 B1 * 2/2003 Nam ............................ 348/614
6,693,958 B1 * 2/2004 Wang et al. .................. 375/232
6,775,334 B1 * 8/2004 Liu et al. ..................... 375/341
2001/0046266 A1 * 11/2001 Rakib et al. ................. 375/259
2002/0054634 A1 * 5/2002 Martin et al. ................ 375/232

FOREIGN PATENT DOCUMENTS

CN  1258166  6/2000
EP  1014635  6/2000

OTHER PUBLICATIONS

Chinese Office Action with English translation dated Aug. 11, 2006.

* cited by examiner

*Primary Examiner*—Mohannad H. Ghayour
*Assistant Examiner*—Vineeta S Panwalkar
(74) *Attorney, Agent, or Firm*—Harness Dickey & Pierce, P.L.C.

(57) ABSTRACT

An equalizer and an equalization method usable in a high definition television (HDTV) are provided. The equalizer may receive an input signal including a data signal and a training sequence and may compensate for distortion of the input signal in a high definition television. The equalizer may include an input signal reuse unit, a filter unit, and an error calculation unit. The error calculation unit may receive an equalizer output signal, may estimate the equalizer output signal at an estimate value, may generate the estimate value as a decision value, and may output a difference between the equalizer output signal and the decision value as the error signal.

27 Claims, 8 Drawing Sheets

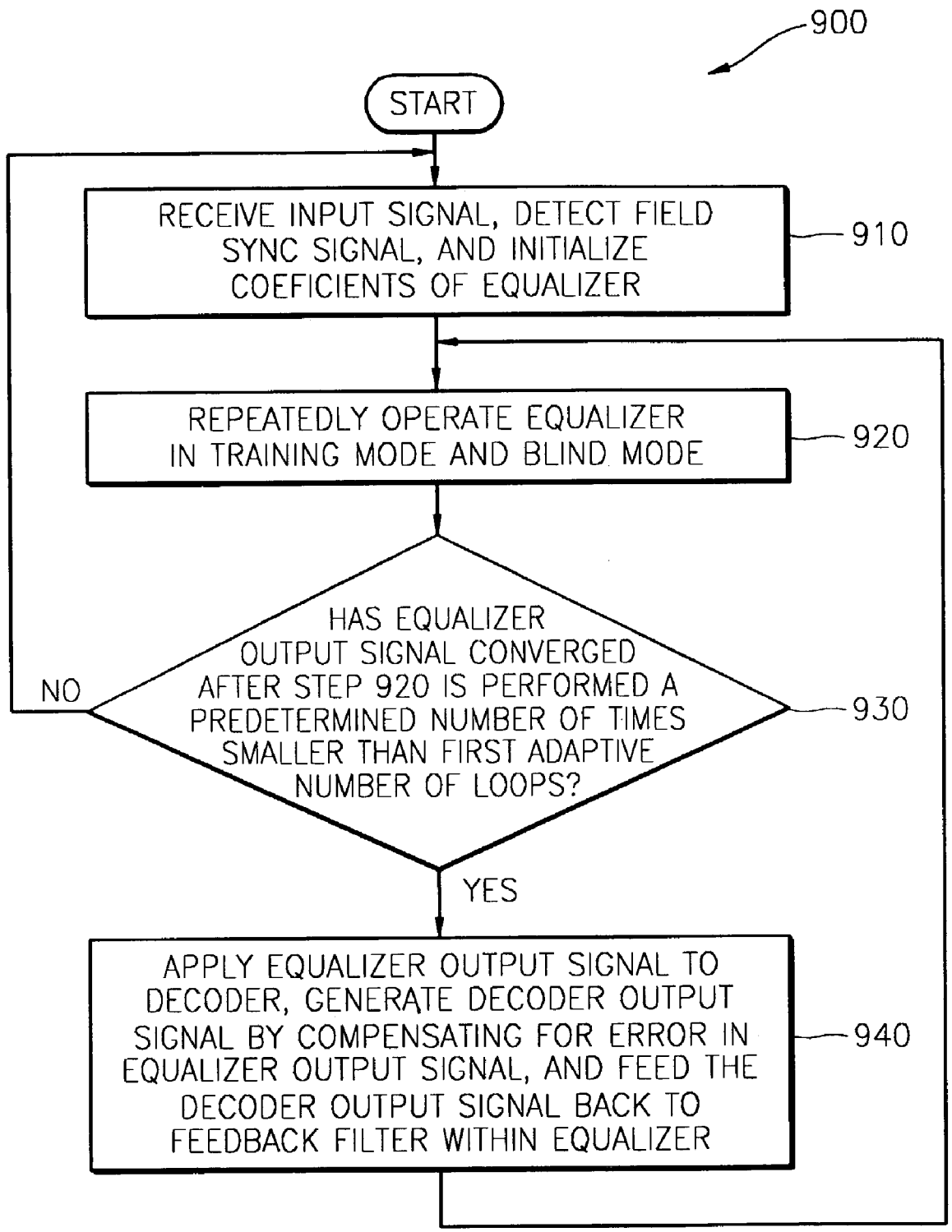

EQUALIZER FOR HIGH DEFINITION TELEVISION AND EQUALIZATION METHOD THEREOF

CROSS-REFERENCE TO RELATED APPLICATIONS

This application claims the priority of Korean Patent Application No. 02-48402, filed Aug. 16, 2002, in the Korean Intellectual Property Office, the entire contents of which are hereby incorporated herein by reference.

FIELD OF THE INVENTION

The present invention generally relates to high definition televisions (HDTVs), and more particularly, to equalizers for reducing errors in HDTVs by compensating for transmission signal distortion possibly caused by channel induced error.

DESCRIPTION OF THE RELATED ART

Generally, physical channels of digital communication systems are air, vacuum, and water. The physical channel vacuum is often considered an ideal medium. A transmission signal is often transmitted through a plurality of multi-paths, since a propagation path of the signal may be refracted by air, or the signal may change according to atmospheric conditions.

The multi-paths may be divided into fixed multi-paths, in which a transmission signal may be reflected or transmitted by, for example, buildings, mountains, cliffs, etc.; and time-varying multi-paths, in which a transmission signal varies during propagation due to, for example, airplanes, cars, etc. During multi-path propagation, the same transmission signal may be transmitted through different paths having different propagation periods of time. Accordingly, in digital signal transmission, the multi-path propagation may lead to inter symbol interference (ISI), which is often considered the largest performance degradation of high-speed digital communication systems.

In accordance with the foregoing discussion, channels may transmit signals under less than perfect conditions due to various causes. This may provoke signal distortion. For example, in the case of a digital transmission mode for HDTV, signal distortion may cause a bit detection error at a receiving end. This may cause the screen of a HDTV to fade or erroneous imaging.

In order to compensate for the above-described problems, a channel equalizer may be provided. The channel equalizer may process a distorted transmission signal in order to compensate for the distorted characteristics of the channel through which the signal was transmitted. This may reduce a bit detection error at a receiving end.

As discussed, channel characteristics of a channel through which a signal is transmitted may be variable according to various factors. A channel equalizer may be required to adaptively equalize the channel according to temporal or circumstantial changes in the channel characteristics. This equalization technique is often referred to as adaptive channel equalization.

In order to adaptively equalize a channel based on a received signal, during a predetermined period of time a transmitting end may transmit a data sequence already known to a receiving end. The receiving end may compare the data sequence distorted through the channel with a known original waveform of data to estimate the degree of channel distortion. This time duration for which a predetermined data stream is transmitted may be referred to as a training mode. The data stream transmitted during the training mode may be referred to as a training sequence. The training sequence is usually realized as a pseudo-random sequence. After the training mode ends data obtained during the training mode is used for a duration of time. This data used for the duration of time is often referred to as a blind mode.

In a channel equalizer, the training sequence may be set as a reference signal, and a difference between the training signal and an equalizer output may be set as an error signal. The channel equalizer may update coefficients thererof using the error signal.

FIG. 1 illustrates a conventional data frame structure that may be transmitted to an HDTV. A single data frame may be composed of two fields. Each field may be composed of 313 segments. Each segment may be a basic unit of the data frame and may be composed of 832 symbols. Typically, each segment begins with a segment sync signal having 4 symbols.

A first segment of the field may be a field sync signal. The field sync signal may have a predetermined pattern that is already known to both transmitting and receiving ends. In such a case, the filed sync signal can be used as a training sequence in a channel equalizer. The field sync signal is typically a periodically generated signal.

Data storing actual information may be contained in the remaining 312 segments. Of course, this excludes the first segment containing the field sync signal. For channel equalization using the training sequence, data having a predetermined pattern known to both the transmitting and receiving parties should be used.

FIG. 2 illustrates a block diagram of a conventional typical equalizer. Referring to FIG. 2, an equalizer 200 may include a feed forward filter 210, a feedback filter 220, a first operation unit 230, a second operation unit 240, and a decision unit 250.

The feed forward filter 210 may receive an input signal INDATA and an error signal ERRV, and is capable of outputting a first output signal FFOUT resulting from compensating for an distortion in the input signal INDATA. The input signal INDATA may have a data frame as shown in FIG. 1 and may be transmitted to an HDTV.

The error signal ERRV may adjust the coefficients of the feed forward filter 210. These coefficients may be multiplied by the input signal INDATA. The resulting products may be added to the first output signal FFOUT.

The first operation unit 230 may sum the first output signal FFOUT with a second output signal FBOUT to obtain an equalizer output signal EQOUT. The second output signal FBOUT may be output from the feedback filter 220. The feedback filter 220 may receive a decision value DCSV output from the decision unit 250, and may output the second output signal FBOUT in response to the error signal ERRV.

The decision value DCSV may be used as the input signal INDATA after being processed by the feed forward filter 210. In addition, the decision value DCSV may be set as a predetermined value by the decision unit 250. Accordingly, similar to the feed forward filter 210, the feedback filter 220 may also compensate for distortion in the input signal INDATA.

The decision unit 250 may receive the equalizer output signal EQOUT and typically outputs a predetermined decision value DCSV. The decision value DCSV may have one value among eight values, i.e., 7, 5, 3, 1, −1, −3, −5, and −7. The decision unit 250 approximates the equalizer output signal EQOUT and outputs one value among the eight values based on the result of approximation. Because an operation of the decision unit 250 is generally understood, a detailed description thereof will be omitted for brevity.

The second operation unit 240 may output a value obtained by subtracting the equalizer output signal EQOUT from the decision value DCSV. This obtained value is the error signal ERRV. The error signal ERRV may be applied to the feed forward filter 210. The error signal ERRV may control the coefficients of the feed forward filter 210 so that the feed forward filter 210 compensates for any distortion in the input signal INDATA.

The first output signal FFOUT may be added to the second output signal FBOUT, and the result of the addition may be output as the equalizer output signal EQOUT. The first and second output signals FFOUT and FBOUT may be the input signal INDATA after being compensated. Consequently, distortion in the input signal INDATA due to a multi-channel may be compensated for by the equalizer 200.

The following description concerns the detailed operations of the equalizer 200 in association with the data structure shown in FIG. 1. The error signal ERRV may have different values in a training mode and a blind mode. When the equalizer 200 is in the training mode, a first segment of a field may be used as a training sequence.

The symbols of the first segment may be input into the equalizer 200 as the input signal INDATA. The input signal INDATA may be compared with 700 symbols in a training sequence, which was previously stored as a reference signal in an HDTV (not shown), to generate the error signal ERRV. The error signal ERRV may control coefficients of the feed forward filter 210 and the feedback filter 220 in order to compensate for distortion in the input signal INDATA.

After the training mode ends, the blind mode may begin. In the blind mode, instead of the first segment, i.e., the training sequence, data from the second segment to 313th segment may be used as the input signal INDATA. Here, the decision unit 250 may estimate the decision value DCSV using various algorithms and may apply the decision value DCSV to the second operation unit 240. The second operation unit 240 may generate the error signal ERRV and compensate for the distortion of the input signal INDATA.

Generally, 700 symbols in a first segment may be used as a training sequence for an equalizer. When the equalizer compensates for distortion in an input signal using the training sequence, convergence of the equalizer may be secured. The convergence speed is generally fast. However, in case of HDTV, normally 700 symbols in a single segment among 313 segments are used as a training sequence.

The length of the training sequence may influence the convergence speed. In other words, as the length of the periodically repeated training sequence increases, actual information data input following the training sequence may be equalized at an increasingly faster speed. In addition, the magnitude of a final error after convergence may be reduced. However, since an equalizer normally uses 700 symbols as a training sequence, the convergence speed is generally slow. This may cause the magnitude of a final error to be large.

SUMMARY OF THE INVENTION

An exemplary embodiment of the present invention may provide an equalizer, which may increase a convergence speed and may decrease a magnitude of a final error using an external memory and a trellis coded modulation (TCM) decoder. However, as is understood, the trellis coded modulation (TCM) decoder is used by way of example only. Other decoders may also be used with the exemplary embodiments described hereinafter.

An exemplary embodiment of the present invention may provide an equalization method for an equalizer the may increase the convergence speed and may decrease the magnitude of a final error using an external memory and a TCM decoder.

An exemplary embodiment of the present invention may provide an equalizer having an input signal reuse unit for inputting a training sequence stored during a training mode to a filter unit during a blind mode when an equalizer output signal is not converged to a predetermined value, a filter unit for receiving an output signal from the input signal reuse unit, the filter unit capable of compensating for distortion in the input signal in response to a error signal and a decision value, the filter unit further capable of outputting a result of the compensation as an equalizer output signal, and an error calculation unit for receiving the equalizer output signal, the error calculation unit capable of estimating the equalizer output signal, the error calculation unit capable of generating an estimate value as the decision value, the error calculation unit further capable of outputting a difference between the equalizer output signal and the decision value as the error signal.

In addition, an exemplary embodiment of the present invention may provide an equalizer having an input signal reuse unit for outputting a training sequence stored during a training mode to a filter unit during a blind mode when an equalizer output signal has not converged to a predetermine value, a filter unit for receiving an output signal of the input signal reuse unit and a decoder output signal, the filter unit capable of compensating for distortion in the input signal in response to an error signal and a decision value, the filter unit further capable of outputting a result of the compensation as the equalizer output signal, an error calculation unit for receiving the equalizer output signal, the error calculation unit capable of estimating the equalizer output signal, the error calculation unit further capable of generating the estimate value as the decision value, the error calculation unit additionally capable of outputting a difference between the equalizer output signal and the decision value as the error signal, and a decoder for receiving the equalizer output signal and for outputting the decoder output signal by compensating for an error in the equalizer output signal.

Furthermore, an exemplary embodiment of the present invention may provide an equalizer including a filter unit for receiving the input signal and a decoder output signal, the filter unit capable of compensating for distortion of the input signal in response to an error signal and a decision value, and the filter unit further capable of outputting the result of compensation as an equalizer output signal, an error calculation unit for receiving the equalizer output signal, the error calculation unit capable of estimating the equalizer output signal, the error calculation unit further capable of generating an estimate value as the decision value, and for outputting a difference between the equalizer output signal and the decision value as the error signal, and a decoder for receiving the equalizer output signal and for outputting the decoder output signal by compensating for an error in the equalizer output signal.

Moreover, an exemplary embodiment of the present invention may provide an equalization method that includes (a) receiving an input signal for detecting a field sync signal and for initializing coefficients of an equalizer, (b) alternately operating the equalizer in training and blind modes, determining whether an equalizer output signal from the equalizer has converged after (b) is performed for a predetermined number of times smaller than a first adaptive number of loops, (d) executing (b) if it is determined that the equalizer output signal has converged, initializing the coefficients of the equalizer and operating the equalizer in an input signal reuse mode if it is determined that the equalizer output signal has not converged, (e) determining whether the equalizer output signal of the equalizer has converged after the equalizer operates in the input signal reuse mode for a predetermined number of times smaller than a second adaptive number of loops, and (f) executing (b) if it is determined that the equalizer output signal has converged or executing (a) if it is determined that the equalizer output signal has not converged.

Additionally, an exemplary embodiment of the present invention may provide an equalization method that includes (a) receiving an input signal for detecting a field sync signal and for initializing coefficients of the equalizer, (b) alternately operating the equalizer in the training and blind modes, (c) determining whether an equalizer output signal of the equalizer has converged after (b) is performed for a predetermined number of times smaller than a first adaptive number of loops, and (d) if it is determined that the equalizer output signal has converged, applying the equalizer output signal to a decoder, generating a decoder output signal by compensating for an error in the equalizer output signal, feeding the decoder output signal back to a feedback filter within the equalizer, and returning to (b), and if it is determined that the equalizer output signal has not converged, returning to (a).

Furthermore, an exemplary embodiment of the present invention may include an arrangement for use with digital systems, including an equalizer, and a signal reuse unit coupled to the equalizer, the signal reuse unit having a storage section for storing a data sequence, the reuse unit capable of outputting to the equalizer an input signal received thereby or signal at least derived from the data sequence.

Moreover, an exemplary embodiment of the present invention may include a method that includes storing a training sequence in a memory unit, and outputting a signal derived from the training sequence to place an equalizer in a first mode, or outputting another signal to place an equalizer in a second mode.

BRIEF DESCRIPTION OF THE DRAWINGS

Exemplary embodiments of the present invention will become more fully understood from the detailed description given hereinbelow and the accompanying drawings which are given by way of illustration only, and thus are not limitative of the present invention, and wherein:

FIG. 9 illustrates a flowchart of an equalization method for an HDTV equalizer, according to another exemplary embodiment of the present invention.

DETAILED DESCRIPTION OF THE EXEMPLARY EMBODIMENTS

Figure 1:
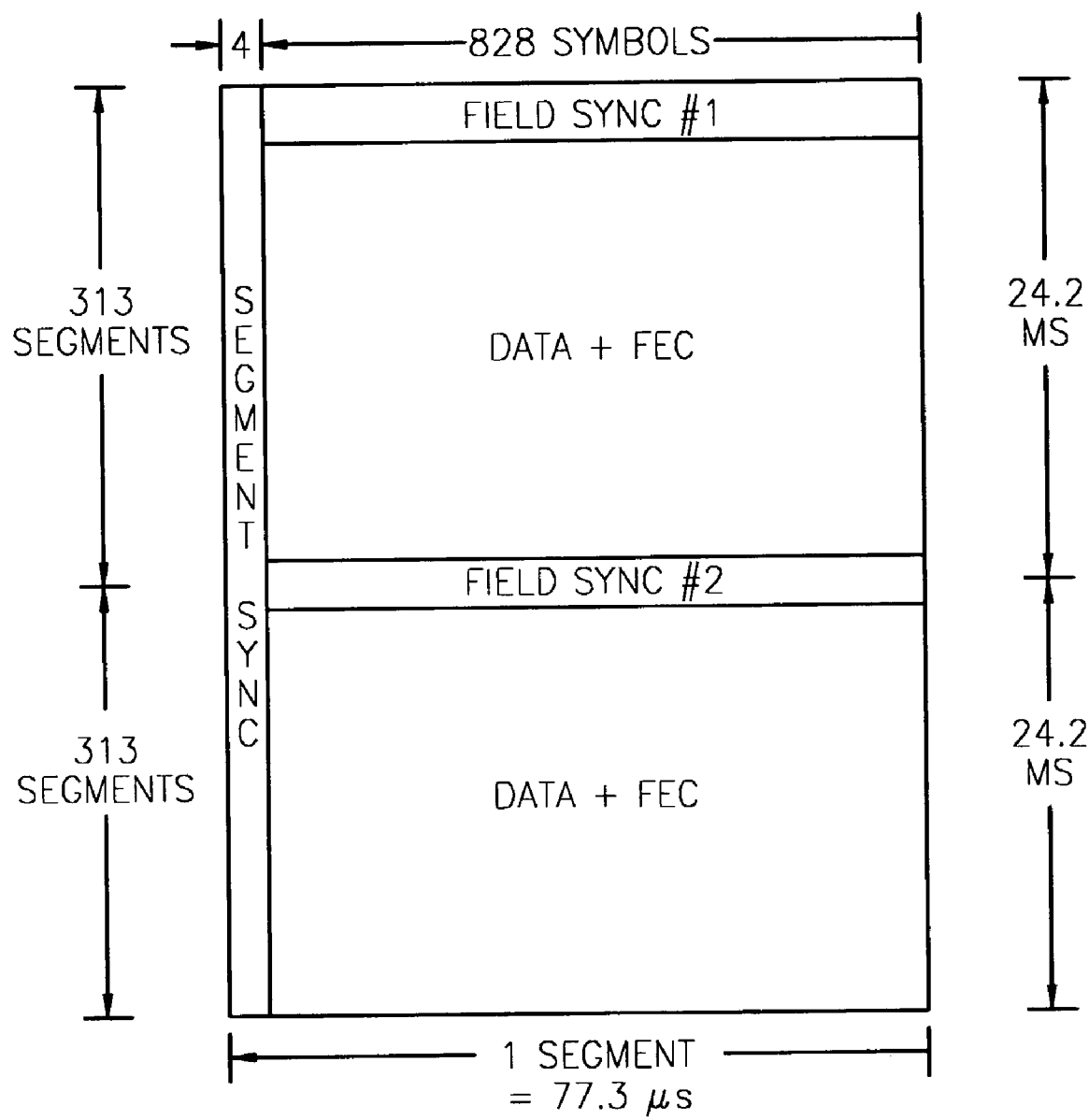
FIG. 1 illustrates a conventional data frame structure that may be transmitted to an HDTV.
Figure 2:
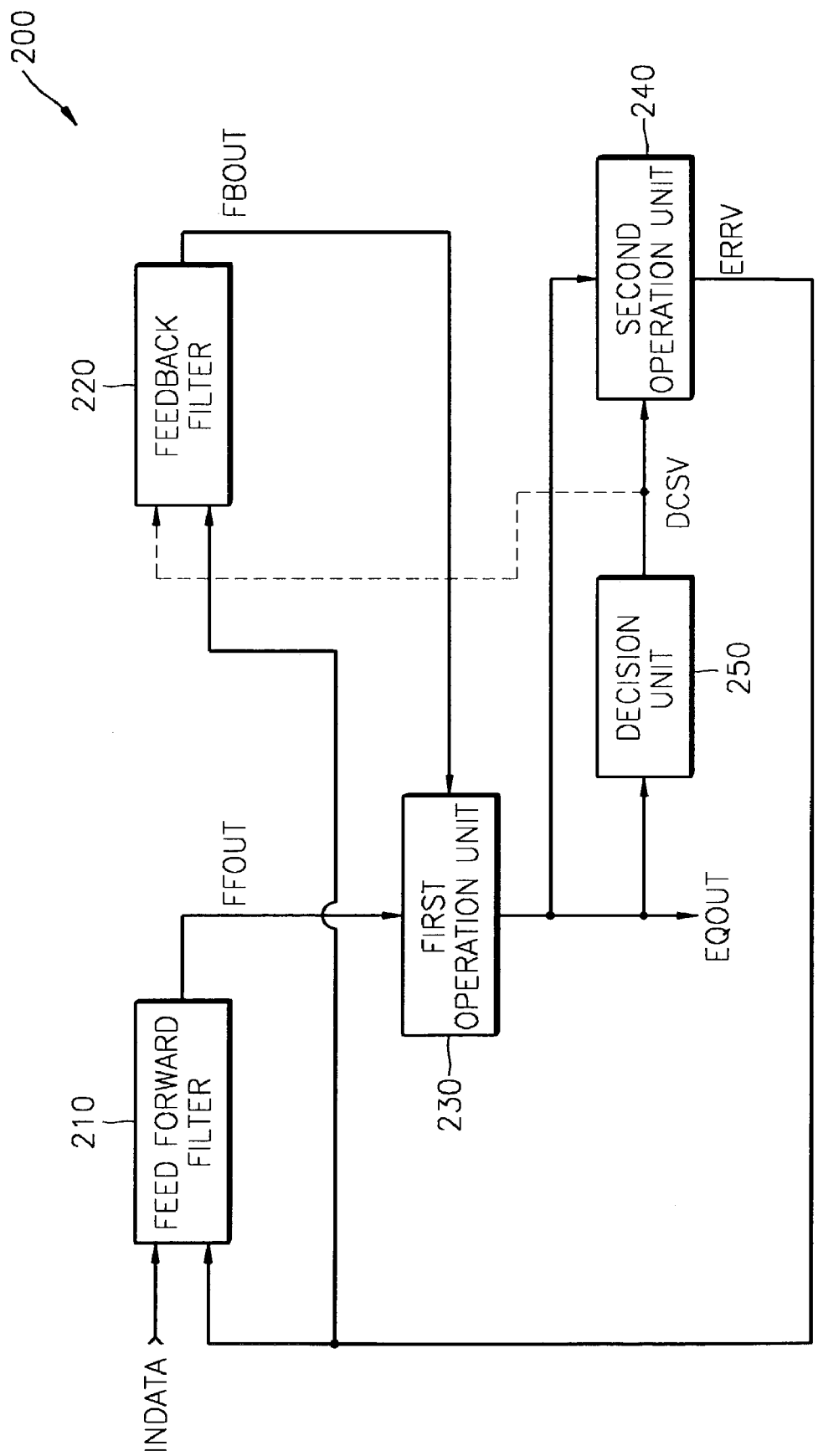
FIG. 2 illustrates a block diagram of a conventional typical equalizer.

Hereinafter, exemplary embodiments of the present invention will be described in detail with reference to the attached drawings. In the drawings, the same reference numerals denote the same elements.

Figure 3:
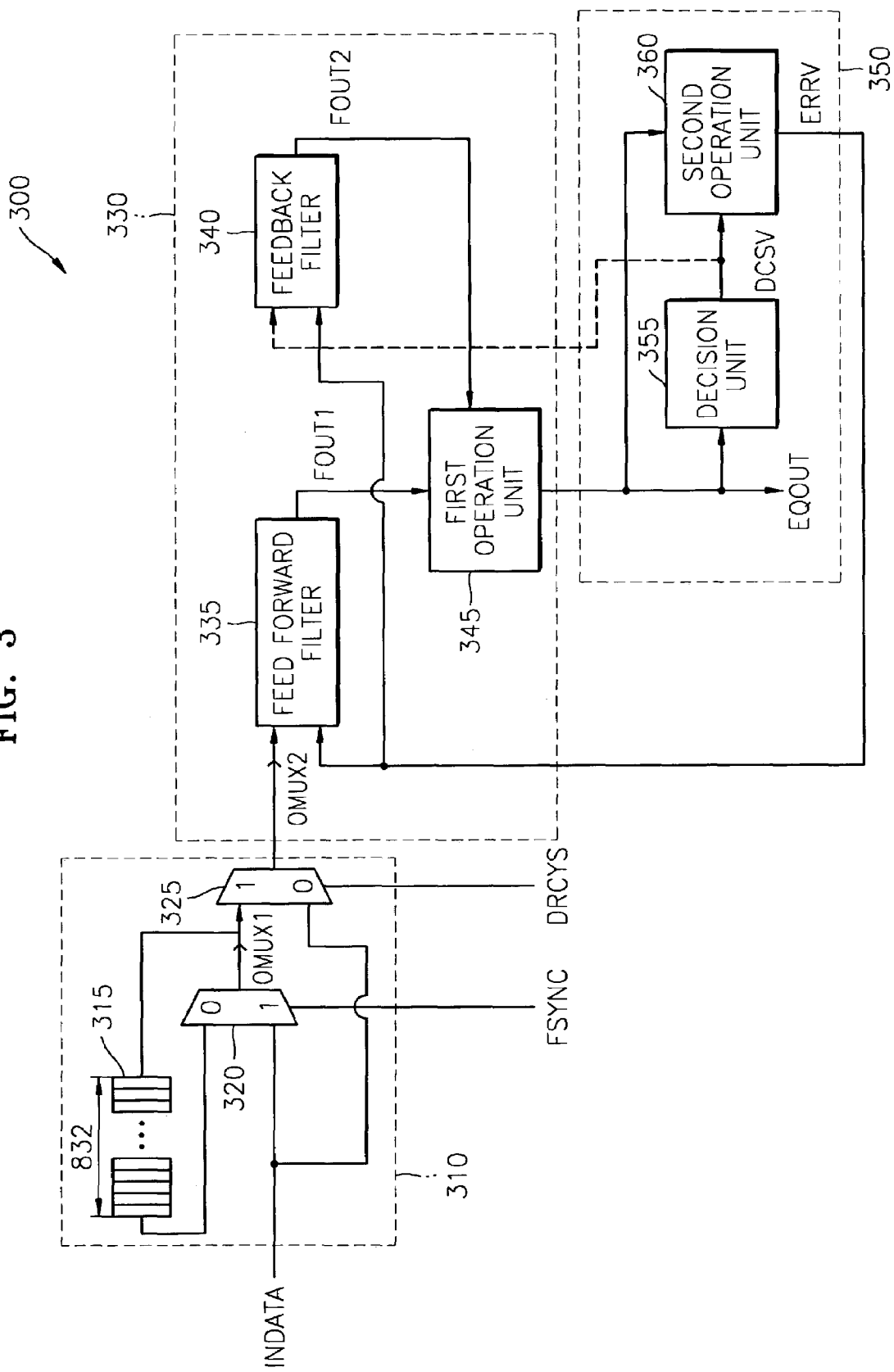
FIG. 3 illustrates a block diagram of an equalizer for an HDTV, according to a first exemplary embodiment of the present invention.

FIG. 3 illustrates a block diagram of an equalizer for a high definition television (HDTV) according to a first exemplary embodiment of the present invention. Such a receiver may also be used in other devices other than an HDTV. Referring to FIG. 3, an equalizer 300 may include an input signal reuse unit 310, a filter unit 330, and an error calculation unit 350.

The input signal reuse unit 310 may input a training sequence, which may have been stored in a training mode, into the filter unit 330 in a blind mode when a predetermined equalizer output signal EQOUT has not converged. The input signal reuse unit 310 may include a training sequence storage section 315, a first selector 320, and a second selector 325. The training sequence storage section 315 may store a training sequence of an input signal INDATA. The first selector 320 is capable of selecting and outputting either an input signal INDATA or the training sequence stored in the training sequence storage section 315 in response to a field sync signal FSYNC. The second selector 325 may select and output either the input signal INDATA or an output signal OMUX1 of the first selector 320 to the filter unit 330 in response to a reuse control signal DRCYS.

The first selector 320 may output the input signal INDATA in response to a first level of the field sync signal FSYNC. Moreover, the first selector 320 may output the training sequence in response to a second level of the field sync signal FSYNC. The field sync signal FSYNC may be generated at the first level a training mode of the input signal INDATA. The second selector 325 may output the output signal OMUX1 of the first selector 320 in response to a first level of the reuse control signal DRCYS. Moreover, the second selector 325 may output the input signal INDATA in response to a second level of the reuse control signal DRCYS. The reuse control signal DRCYS may be generated at the first level when the equalizer output signal EQOUT fails to converge into a predetermined range. The training sequence storage section 315 may be a register for storing a training sequence.

The filter unit 330 may receive an output signal OMUX2 of the input signal reuse unit 310. In response the received output signal OMUX2, the filter unit 330 is capable of compensating for any distortion in the input signal INDATA in response to a predetermined error signal ERRV and a predetermined decision value DCSV. Moreover, the filter unit 330 may output a result of any performed compensation as the equalizer output signal EQOUT.

The error calculation unit 350 may receive the equalizer output signal EQOUT. In such a case, the error calculation unit 350 is capable of estimating the equalizer output signal EQOUT to a predetermined value, and can generate the result of estimation as a decision value DCSV. In addition, the error calculation unit 350 can output a difference between the equalizer output signal EQOUT and the decision value DCSV as the error signal ERRV.

Figure 6:
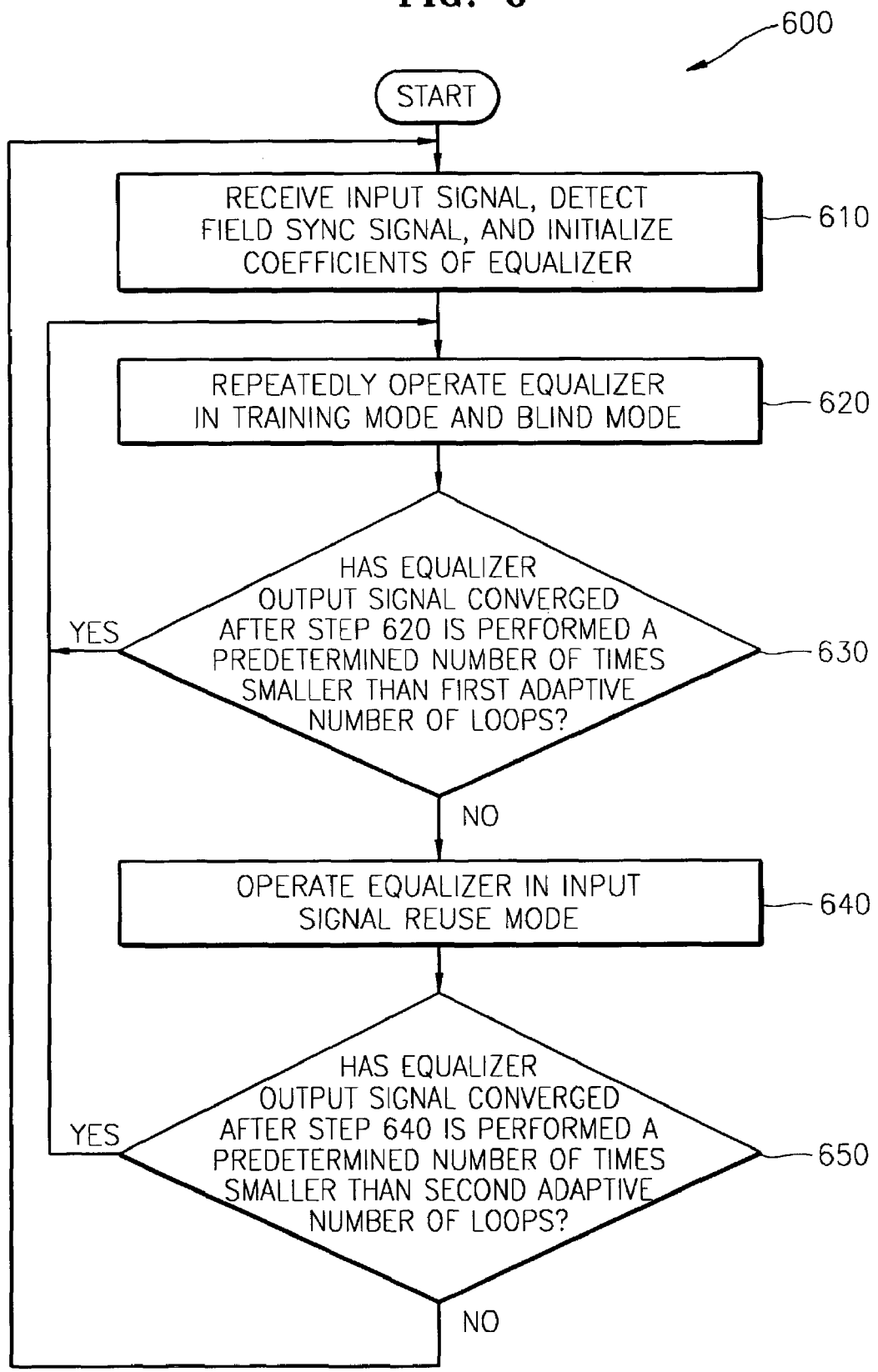
FIG. 6 illustrates a flowchart of an equalization method for an HDTV equalizer, according to an exemplary embodiment of the present invention.

An operation of the equalizer 300 illustrated in FIG. 3 corresponds to an equalization method 600 illustrated in FIG. 6. Thus, the operation of the equalizer 300 will be described together with the equalization method 600 illustrated in FIG. 6.

FIG. 6 illustrates a flowchart of an equalization method of an HDTV equalizer, according to an exemplary embodiment of the present invention. Referring to FIG. 6, in step 610, an input signal INDATA may be received, a field sync signal FSYNC may be detected, and the coefficients of the equalizer 300 may be initialized. The equalizer 300 may operate repeatedly in the training mode and the blind mode in step 620. It may be determined whether an equalizer output signal EQOUT of the equalizer 300 has converged to a predetermined value after step 620 is performed for a predetermined number of times smaller than a first adaptive number of loops in step 630. If the equalizer output signal EQOUT has converged, the procedure may return to step 620. If the equalizer output signal EQOUT has not converged, the coefficients of the equalizer 300 may be initialized and the equalizer 300 may operate in an input signal reuse mode in step 640. It may be determined whether the equalizer output signal EQOUT of the equalizer 300 has converged after step 640 is performed for a predetermined number of times smaller than a second adaptive number of loops in step 650. If the equalizer output signal EQOUT has converged, the procedure may return to step 620. If the equalizer output signal EQOUT has not converged, the procedure may return to step 610.

Hereinafter, an operation and equalization method of an HDTV equalizer according to a first exemplary embodiment of the present invention will be described in detail with reference to FIGS. 3 and 6.

A typical equalizer alternately operates in a training mode and a blind mode depending on the type of data contained in an input signal. During the training mode, a training sequence is input to the equalizer, which may determine convergence or non-convergence of an equalizer output signal. Since the training sequence is generally short, the typical equalizer has a slow convergence speed and cannot completely equalize a channel. Therefore, an improved equalizer as shown in FIG. 3 is suggested.

In step 610, the input signal INDATA may be received, the field sync signal FSYNC may be detected, and the coefficients of the equalizer 300 may be initialized. In order to increase the convergence speed, the coefficients of the equalizer 300 may be initialized through channel estimation after detection of the field sync signal FSYNC. The field sync signal FSYNC may be data contained in a first segment of the input signal INDATA, which is shown in FIG. 1.

The coefficients of the equalizer 300 denote the tap coefficients of the filters 335 and 340 within the equalizer 300. According to channel estimation, a correlation between the field sync signal FSYNC and the input signal INDATA may be obtained; a multi-path typically exists when the correlation is not 0. Values obtained by normalizing the tap coefficients using a largest correlation may be used as the initial coefficients of the equalizer 300.

The equalizer 300 may repeatedly operate in the training mode and blind mode in step 620. A method of operating the equalizer 300 may be substantially the same as the conventional method. The input signal INDATA may be applied to the input signal reuse unit 310. Since the equalizer 300 is not in an input signal reuse mode, a reuse control signal DRCYS may be in a second logic level. Here, for the clarity of description, the second logic level may be defined as 0.

The input signal INDATA may include a training mode and a blind mode. A duration for which the data of a first segment of the input signal INDATA is input to an equalizer 300 may be referred to as a training mode, and a duration for which the data of a second segment through the 313th segment of the input signal INDATA is input to the equalizer may be referred to as a blind mode.

In the training mode, the field sync signal FSYNC may be in a first level. Here, for the clarity of description, a second logic level may be defined as 1. Accordingly, in the training mode, the first selector 320 may select a training sequence of the input signal INDATA and may store the training sequence in the training sequence storage section 315. The training sequence may also be applied to the filter unit 330 through the second selector 325.

When the blind mode begins after the training mode ends, the field sync signal FSYNC may reach a second level. Accordingly, the first selector 320 may output the training sequence stored in the training sequence storage section 315. The reuse control signal DRCYS may be maintained at a second level, so the data of the second segment through the 313th segment of the input signal INDATA may be input to the filter unit 330. In other words, while the reuse control signal DRCYS is at the second level, the filter unit 330 and the error calculation unit 350 may perform equalization using the input signal INDATA during the training and blind modes.

The filter unit 330 may include a feed forward filter 335, a feedback filter 340, and a first operation unit 345. The error calculation unit 350 may include a decision unit 355 and a second operation unit 360. Equalization operations performed by the filter unit 330 and the error calculation unit 350 are known, and thus a detailed description thereof has been omitted for brevity.

In step 630, it is determined whether the equalizer output signal EQOUT of the equalizer 300 converged after step 620, in which the alternate training and blind modes of the input signal INDATA are input to the equalizer 300 to operate the equalizer 300 for a predetermined number of times. An operation of input of a single field, i.e., a single training mode and a single blind mode, may be defined as a single first adaptive loop. When step 620 is performed, convergence or non-convergence of the equalizer output signal EQOUT may be determined. This occurs over the first adaptive number of loops, which may be set by a user.

If it is determined that the equalizer output signal EQOUT has converged, a new input signal INDATA is continuously received, and step 620 is performed. If it is determined that the equalizer output signal EQOUT has not converged, the coefficients of the equalizer 300 may be initialized and then the equalizer 300 operates in an input signal reuse mode in step 640.

Figure 8:
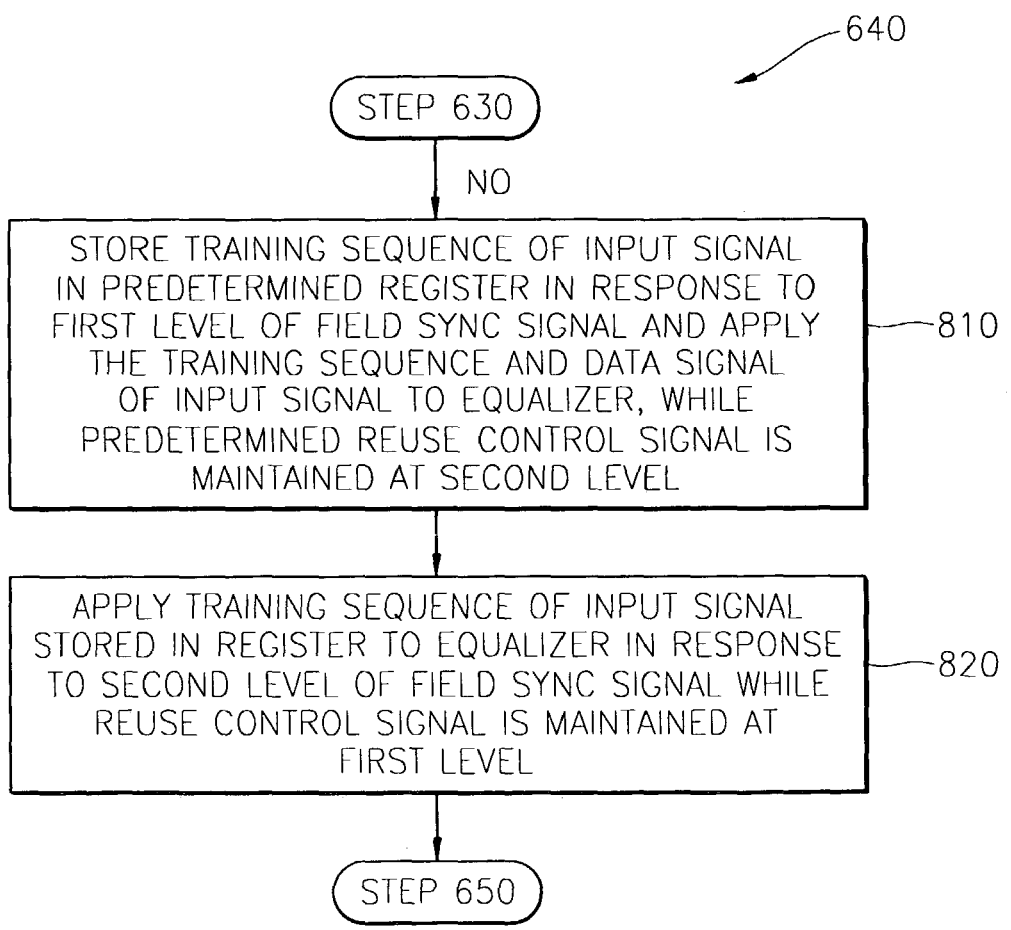
FIG. 8 illustrates a flowchart of step 640 illustrated in FIG. 6.

FIG. 8 illustrates a flowchart of step 640 illustrated in FIG. 6. Referring to FIG. 8, while a predetermined reuse control signal DRCYS is maintained at a second level, in step 810 the training sequence of the input signal INDATA may be stored in a predetermined register in response to a first level of a field sync signal FSYNC, and the training sequence and data signal of the input signal INDATA may be applied to the equalizer 300 to operate the equalizer 300. The input signal reuse unit 310 may perform the operation of step 810 in a non-input signal reuse mode.

The following description concerns the operation in an input signal reuse mode. In the input signal reuse mode, while the reuse control signal DRCYS is maintained at a first level, the training sequence of the input signal INDATA that may be stored in a register is applied to the equalizer 300 in response to a second level of the field sync signal FSYNC in order to operate the equalizer 300 in step 820.

If it is determined that the equalizer 300 output signal EQOUT has not converged, a flag signal may be generated using a separate algorithm. The flag signal activates the reuse control signal DRCYS to the first level. Here, the separate algorithm and flag signal can be easily understood by those skilled in the art, and thus a detailed description thereof will be omitted for brevity.

When the reuse control signal DRCYS is at the first level, the training sequence stored in the training sequence storage section 315 may be applied to the filter unit 330 even in the blind mode. The field sync signal FSYNC is generated at the first level when in the training mode. Accordingly, during the training mode, the training sequence of the input signal INDATA is stored in the training sequence storage section 315 through the first selector 320.

When the field sync signal FSYNC reaches the second level in the blind mode, the first selector 320 may output the training sequence stored in the training sequence storage section 315 as the output signal OMUX1. Here, when the reuse control signal DRCYS goes to the first level, the second selector 325 may not apply the input signal INDATA to the filter unit 330, but may apply the output signal OMUX1 of the first selector 320, i.e., the training sequence, to the filter unit 330.

Accordingly, even during the blind mode, the training sequence may be applied to the filter unit 330. Then, the filter unit 330 and the error calculation unit 350 converge the input signal INDATA using the training sequence. Due to the input signal reuse mode of the input signal reuse unit 310, the length of the training sequence input to the filter unit 330 increases by the length of one field of the input signal INDATA. Accordingly, the convergence speed of the input signal INDATA is increased, and the magnitude of an error in the converged input signal INDATA is decreased. The detailed description of the filter unit 330 and the error calculation unit 350 converging the input signal INDATA will be described later.

If the input signal INDATA has not converged even using the training sequence input during the blind mode, the equalizer 300 may continuously operate in the input signal reuse mode. In other words, the reuse control signal DRCYS may be maintained in the first level. When a new training mode of the input signal INDATA starts, the field sync signal FSYNC typically moves to the first level.

Then, the new training sequence may be output through the first selector 320 and then stored in the training sequence storage section 315 and simultaneously input to the filter unit 330 through the second selector 325. When a new blind mode begins after the training mode ends, the field sync signal FSYNC may move to the second level. Then, the first selector 320 may select and output the new training sequence stored in the training sequence storage section 315. The second selector 325 may output the output signal OMUX1 of the first selector 320 to the filter unit 330.

During the new blind mode, the new training sequence of the input signal INDATA may also be applied to the filter unit 330. Accordingly, the filter unit 330 and the error calculation unit 350 may converge the input signal INDATA using the new training sequence.

An operation in which a training sequence of the input signal INDATA is input to the filter unit 330 during a single training mode and a single blind mode may be referred to a single operation in the input signal reuse mode. If the equalizer output signal EQOUT has converged within a smaller number of loops in the input signal reuse mode than the second adaptive number of loops, for example, N2, in step 650, the procedure may return to step 620. Moreover, operation in the input signal reuse mode may be stopped, and the equalizer 300 may operate in the alternate training mode and blind mode for a new input signal. However, if the equalizer output signal EQOUT has not converged within the smaller number of loops in step 650, the procedure returns to step 610. In this case, the input signal INDATA may not converge within N2 convergence operations, so the unconverged input signal INDATA is abandoned, and the coefficients of the equalizer 300 are initialized to start a new equalization.

Figure 4:
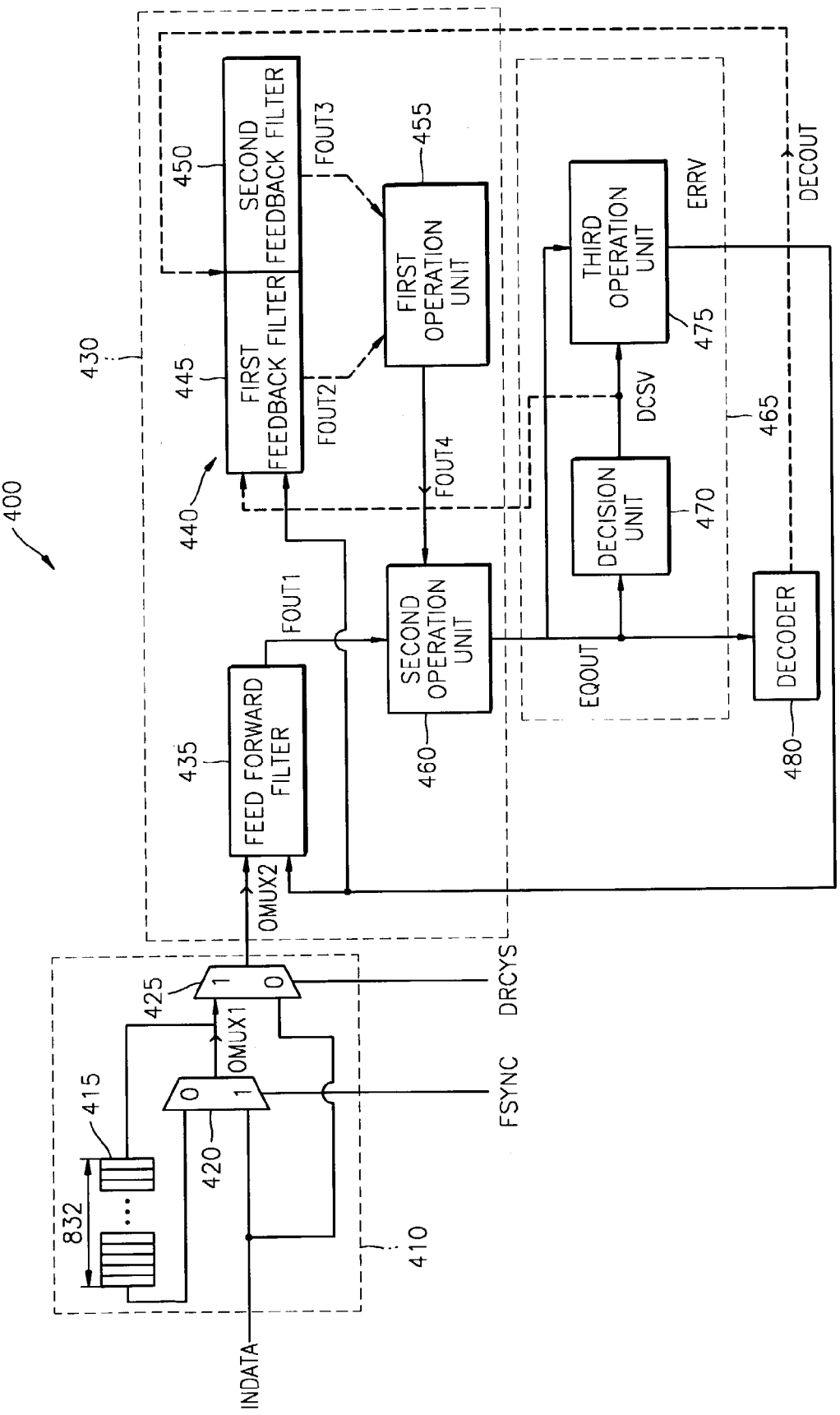
FIG. 4 illustrates a block diagram of an equalizer for an HDTV, according to a second exemplary embodiment of the present invention.

FIG. 4 illustrates a block diagram of an HDTV equalizer according to a second exemplary embodiment of the present invention. Referring to FIG. 4, the equalizer 400 includes an input signal reuse unit 410, a filter unit 430, an error calculation unit 465, and a decoder 480. The structure and operation of the input signal reuse unit 410 are substantially the same as those of the input signal reuse unit 310 of the equalizer 300 shown in FIG. 3, and thus a detailed description thereof will be omitted.

The filter unit 430 may receive an output signal OMUX2 of the input signal reuse unit 410 and a predetermined decoder output signal DECOUT. The filter unit 430 is capable of compensating for distortion in an input signal INDATA in response to a predetermined error signal ERRV and a predetermined decision value DCSV. Moreover, the filter unit 430 is capable of outputting a compensation result as an equalizer output signal EQOUT.

More specifically, the filter unit 430 may include a feed forward filter 435, a feedback filter 440, a first operation unit 455, and a second operation unit 460. The feed forward filter 435 may receive the output signal OMUX2 of the input signal reuse unit 410 and is capable of outputting a first output signal FOUT1 by compensating for an error of the output signal OMUX2 in response to the error signal ERRV. The feedback filter 440 may receive the decision value DCSV and the decoder output signal DEOUT. In addition, the feedback filter 440, in response to the error signal ERRV, may output a second output signal FOUT2 by compensating for an error in the decision value DCSV, and further output a third output signal FOUT3 by compensating an error in the decoder output signal DEOUT.

The feedback filter 440 may include a first feedback filter 445 and a second feedback filter 450. The first feedback filter 445 may receive the decision value DCSV and output the second output signal FOUT2 in response to the error signal ERRV. The second feedback filter 450 may receive the decoder output signal DEOUT and output the third output signal FOUT3 in response to the error signal ERRV.

Until the decoder 480 outputs the decoder output signal DEOUT after receiving the equalizer output signal EQOUT, the first feedback filter 445 may receive the decision value DCSV and output the second output signal FOUT2. When the decoder output signal DEOUT is output, the second feedback filter 450 may receive the decoder output signal DEOUT and outputs the third output signal FOUT3.

The first operation unit 455 may combine the second output signal FOUT2 with the third output signal FOUT3 to output a fourth output signal FOUT4. The second operation unit 460 may combine the first output signal FOUT1 with the fourth output signal FOUT4 to output the equalizer output signal EQOUT.

The error calculation unit 465 is capable of receiving the equalizer output signal EQOUT, estimating the equalizer output signal EQOUT at a predetermined estimate value, generating the estimate value as the decision value DCSV. Moreover, the error calculation unit 465 may output a difference between the equalizer output signal EQOUT and the decision value DCSV as the error signal ERRV. More specifically, the error calculation unit 465 may include a decision unit 470 and a third operation unit 475. The decision unit 470 may receive the equalizer output signal EQOUT and may output the decision value DCSV at which the equalizer output signal EQOUT is estimated. The third operation unit 475 is capable of outputting the difference between the equalizer output signal EQOUT and the decision value DCSV as the error signal ERRV.

The decoder 480 may receive the equalizer output signal EQOUT and may output the decoder output signal DECOUT by compensating for an error in the equalizer output signal EQOUT. The decoder 480 may be a trellis coded modulation (TCM) decoder.

Figure 7:
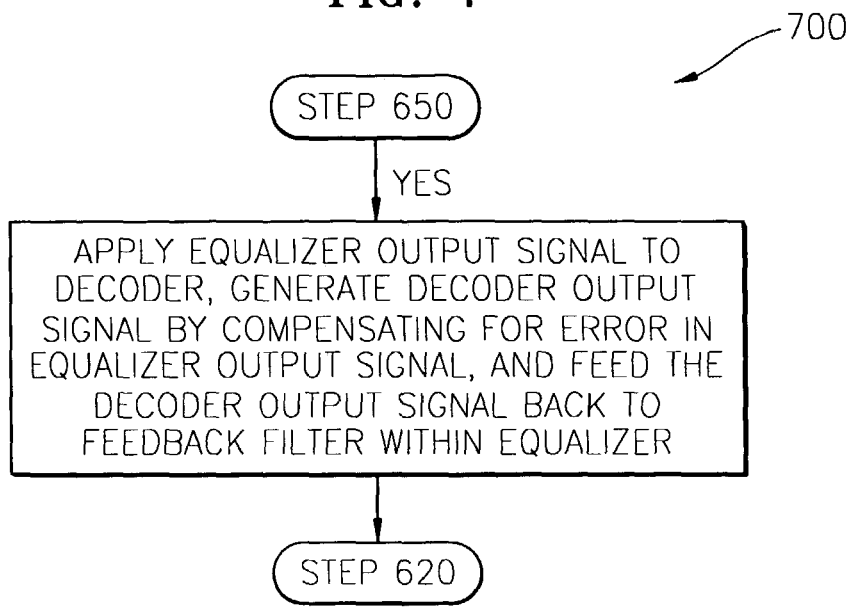
FIG. 7 illustrates a flowchart of the operation of a decoder, which may used during the equalization method illustrated in the flowchart of FIG. 6.

An operation of the equalizer 400 illustrated in FIG. 4 substantially corresponds to equalizations 600 and 700 shown in FIGS. 6 and 7. Thus, an operation of the equalizer 400 is described together with the equalizations 600 and 700 shown in FIGS. 6 and 7.

FIG. 7 illustrates a flowchart of the operation of a decoder, which may be additionally used during the equalization method illustrated in FIG. 6. Referring to FIG. 7, in the equalization method 700, if the equalizer output signal EQOUT has converged in step 650 in FIG. 6, the equalizer output signal EQOUT may be applied to a predetermined decoder, and an output signal of the decoder obtained by compensating an error in the equalizer output signal EQOUT is fed back to a feedback filter within the equalizer, and then the procedure may return to step 620.

Hereinafter, an operation and equalization method of an HDTV equalizer according to a second exemplary embodiment of the present invention will be described in detail with reference to FIGS. 4, 6, and 7. The equalizer 400 shown in FIG. 4 further includes a decoder 480 in addition to the equalizer 300 shown in FIG. 3. The structure of the feedback filter 430 is different from the feedback filter 340 shown in FIG. 3. The equalizer 400 according to the second exemplary embodiment of the present invention may perform steps 610 through 650.

In an Advanced Television Systems Committee (ATSC) Vestigial Sideband (VSB) transmission mode, accuracy of a signal input to the feedback filter 440 of the equalizer 400 assists in ensuring good performance of the equalizer 400. When a signal having many errors is input to the feedback filter 440, error propagation may occur, so the equalizer 400 may have difficulty compensating for channel distortion. Therefore, an operation of accurately estimating a signal input to the feedback filter 440 may be required.

When the equalizer output signal EQOUT has converged, the equalizer output signal EQOUT may be applied to the decoder 480. The decoder 480 may be a TCM decoder. A TCM decoder is referred to as a Viterbi decoder. This type of decoder is very helpful in correcting a random error occurring in a channel for mobile communication or satellite communication systems.

An error remaining in the equalizer output signal EQOUT may be compensated for using the decoder 480, and the error-compensated decoder output signal DECOUT may be used as an input signal of the feedback filter 440. Accordingly, an accurate signal is input to the feedback filter 440, thereby error propagation may be prevented, and a signal-to-noise ratio (SNR) margin of the equalizer 400 may be increased.

The equalizer output signal EQOUT may be decoded in the decoder 480 with a time delay. In order to overcome this problem, the structure of the feedback filter 440 may divided into a first feedback filter 445 and a second feedback filter 450.

While the equalizer output signal EQOUT is decoded by the decoder 480, the decision value DCSV obtained by estimating the equalizer output signal EQOUT to a predetermined estimate value using the decision unit 470 may be input to the first feedback filter 445. Then, the first feedback filter 445 may filter the decision value DCSV in response to the error signal ERRV to output a second output signal FOUT2. Accordingly, a depth of the decoder 480 is substantially the same as a length of the first feedback filter 445.

After decoding of the equalizer output signal EQOUT is completed by the decoder 480 and the decoder output signal DECOUT is generated, the decoder output signal DECOUT may be input to the second feedback filter 450. Then, the second feedback filter 450 may filter the decoder output signal DECOUT in response to the error signal ERRV to output a third output signal FOUT3.

During an operation of the decoder 480, the decision value DCSV, which may have an error, may be used as an input of the feedback filter 440. However, a duration of the operation of the decoder 480 is short. After the operation of the decoder 480, the decoder output signal DECOUT, obtained after an error may be substantially compensated for, may be used as an input of the feedback filter 440. Therefore, an error propagation in the feedback filter 440 due to a signal having an error may be prevented, and the SNR margin of the equalizer 400 may be increased.

Figure 5:
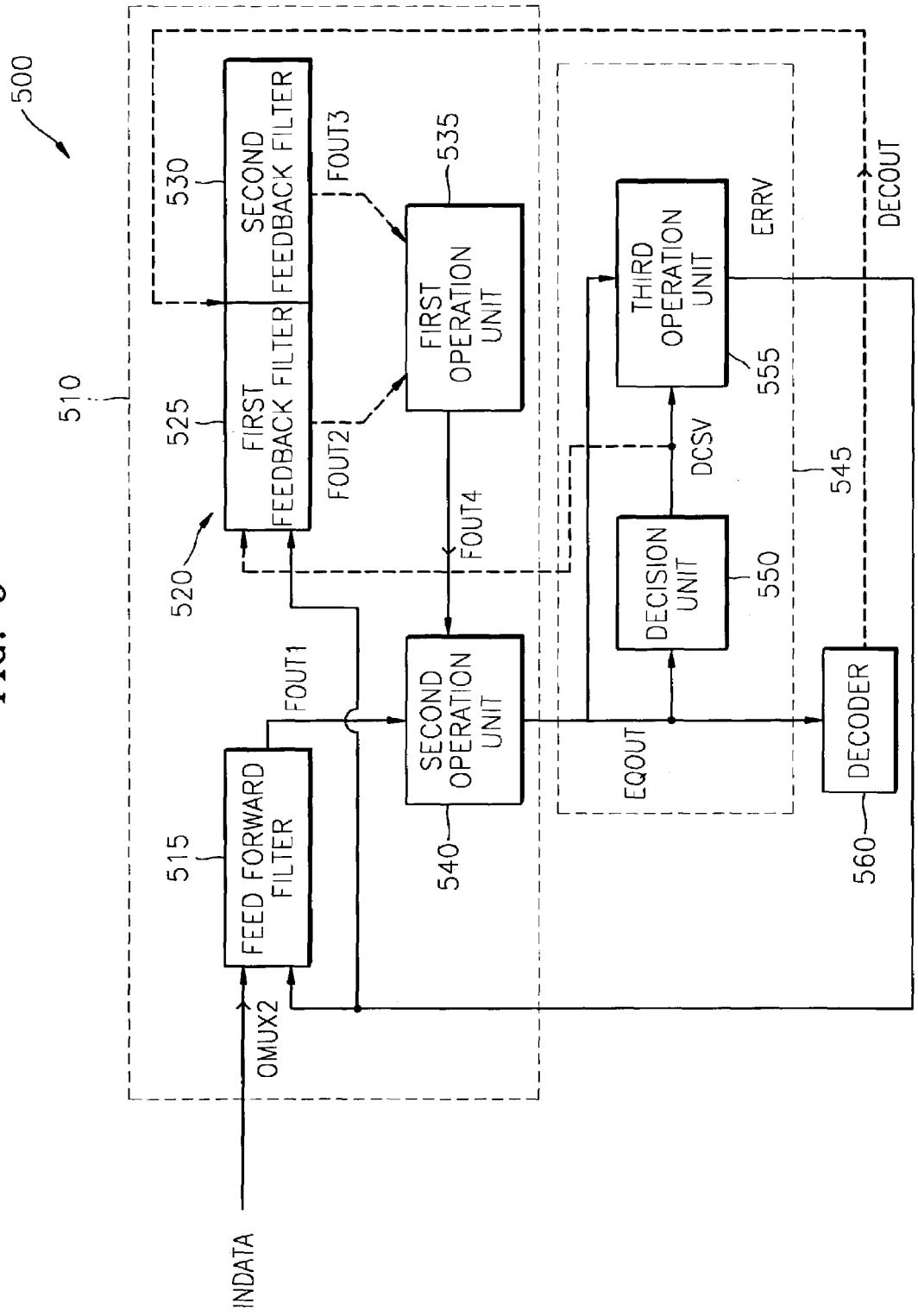
FIG. 5 illustrates a block diagram of an equalizer for an HDTV, according to a third exemplary embodiment of the present invention.

FIG. 5 illustrates a block diagram of an HDTV equalizer according to a third exemplary embodiment of the present invention. Referring to FIG. 5, an equalizer 500 according to the third exemplary embodiment of the present invention may include a filter unit 510, an error calculation unit 545, and a decoder 560.

The filter unit 510 may receive an input signal INDATA and a predetermined decoder output signal DECOUT. The filter unit 510 is capable of compensating for distortion in the input signal INDATA in response to a predetermined error signal ERRV and a predetermined decision value DCSV. Moreover, the filter unit 510 may output the result of compensation as an equalizer output signal EQOUT. The structure of the filter unit 510 is substantially the same as that of the filter unit 430 shown in FIG. 4, and thus a detailed description thereof will be omitted for brevity.

The error calculation unit 545 may receive the equalizer output signal EQOUT, and may estimate the equalizer output signal EQOUT at a predetermined estimate value. In addition, the error calculation unit 545 may generate the estimate value as the decision value DCSV, and may output a difference between the equalizer output signal EQOUT and the decision value DCSV as the error signal ERRV. The structure of the error calculation unit 545 is substantially the same as that of the error calculation unit 465 shown in FIG. 4, and thus a detailed description thereof will be omitted brevity.

The decoder 560 may receive the equalizer output signal EQOUT and may output the decoder output signal DECOUT by compensating for an error in the equalizer output signal EQOUT. The structure of the decoder 560 is substantially the same as that of the decoder 480 shown in FIG. 4, and thus a detailed description thereof will be omitted brevity.

The operation of the equalizer 500 corresponds to an equalization method 900 illustrated in FIG. 9. Accordingly, the operation of the equalizer 500 shown in FIG. 5 will be described together with the equalization method 900 illustrated in FIG. 9.

FIG. 9 illustrates a flowchart of an equalization method for an HDTV equalizer, according to another exemplary embodiment of the present invention. Referring to FIG. 9, in step 910, an input signal INDATA including a data signal and a training sequence may be received, a field sync signal FSYNC may be detected, and the coefficients of the equalizer 500 may be initialized. The equalizer 500 may operate in alternate training and blind modes in step 920. It may be determined whether an equalizer output signal EQOUT of the equalizer 500 has converged after step 920 is performed for a predetermined number of times smaller than a first adaptive number of loops in step 930. If it is determined that the equalizer output signal EQOUT has converged in step 930, the equalizer output signal DECOUT may be input to a predetermined decoder. Moreover, an error in the equalizer output signal EQOUT may be compensated for to generate a decoder output signal DECOUT, and the decoder output signal DECOUT may be fed back to a feedback filter within the equalizer 500 in step 940. Thereafter, the procedure may return back to step 920. If it is determined that the equalizer output signal EQOUT has not converged in step 930, the procedure may return to step 910.

Hereinafter, a operation and equalization method of the equalizer 500 according to the third exemplary embodiment of the present invention will be described in detail with reference to FIGS. 5 and 9. The equalizer 500 is substantially the same as the equalizer 400 shown in FIG. 4, with the exception that the equalizer 500 may not have the input signal reuse unit 410. In other words, the input signal INDATA may be input to the filter unit 430 through the input signal reuse unit 410 in the equalizer 400 shown in FIG. 4. However, in the equalizer 500 shown in FIG. 5, an input signal reuse mode may not exist. The filter unit 510 may directly receives the input signal INDATA.

In step 910, the input signal INDATA may be received, a field sync signal FSYNC may be detected, and the coefficients of the equalizer 500 may be initialized. The equalizer 500 may operate in alternate training and blind modes of the input signal INDATA in step 920. It is determined whether an equalizer output signal EQOUT of the equalizer 500 has converged after step 920 is performed for a predetermined number of times smaller than a first adaptive number of loops, which may be set by a user, in step 930. The equalizer 500 performs steps 910 through 930 in substantially the same manner as the equalizer 400 shown in FIG. 4.

If it is determined that the equalizer output signal EQOUT has not converged in step 930, the procedure may return to step 910. If it is determined that the equalizer output signal EQOUT has converged in step 930, the converged equalizer output signal EQOUT may be applied to the decoder 560. The decoder 560 may output a decoder output signal DECOUT using substantially the same operation as the decoder 480 shown in FIG. 4. The decoder output signal DECOUT may be input to the feedback filter 520. The feedback filter 520 may have the same structure as the feedback filter 440 shown in FIG. 4 and may output a second output signal FOUT2 and a third output signal FOUT3 using substantially the same operation as that of the feedback filter 440.

The equalizer 500 show in FIG. 5 operates in substantially the same manner as the equalizer 400 shown in FIG. 4, with the exception that the equalizer 500 may not have an input signal reuse mode, and thus a detailed description thereof will be omitted brevity.

As described above, according to an HDTV equalizer and an equalization method of the exemplary embodiments of the present invention, a training sequence of an input signal may be input to an equalizer using an external memory during a blind mode as well as a training mode, thereby increasing a convergence speed of the input signal. In addition, channel distortion may be more accurately compensated for using a TCM decoder, so that a magnitude of a final error in an equalizer output signal may be reduced.

The invention has been particularly shown and described with reference to several exemplary embodiments thereof, and particular terms are used. However, the exemplary embodiments and particular terms should be considered in descriptive sense only and not for purposes of limitation. It will be understood by those skilled in the art that various changes in forms and details may be made without departing from the spirit and scope of the present invention. The scope of the present invention is defined by the appended claims.

What is claimed is:

1. An equalizer, comprising:
an input signal reuse unit for inputting a training sequence stored during a training mode to a filter unit during a blind mode when an equalizer output signal is not converged to a predetermined value;
a filter unit for receiving an output signal from the input signal reuse unit, the filter unit capable of compensating for distortion in the input signal in response to a error signal and a decision value, the filter unit further capable of outputting a result of the compensation as an equalizer output signal; and
an error calculation unit for receiving the equalizer output signal, the error calculation unit capable of estimating the equalizer output signal, the error calculation unit capable of generating an estimate value as the decision value, the error calculation unit further capable of outputting a difference between the equalizer output signal and the decision value as the error signal, wherein
the equalizer is configured to operate alternately in the training mode and the blind mode for a number of times smaller than a first adaptive number of loops and configured to initialize coefficients of the equalizer and operate in an input signal reuse mode for a number of times smaller than a second adaptive number of loops if the equalizer output signal is not converged after operating alternately in the training mode and the blind mode for the number of times smaller than the first adaptive number of loops.

2. The equalizer of claim 1, wherein the input signal reuse unit comprises:
a training sequence storage section for storing the training sequence of the input signal;
a first selector for selecting and outputting one of the input signal and the training sequence stored in the training sequence storage section in response to a field sync signal; and
a second selector for selecting one of the input signal and an output signal of the first selector in response to a reuse control signal, the second selector capable of outputting the selected signal to the filter unit.

3. The equalizer of claim 2, wherein the first selector outputs the input signal in response to a first level of the field sync signal, and the first selector outputs the training sequence in response to a second level of the field sync signal.

4. The equalizer of claim 2, wherein the second selector outputs the output signal of the first selector in response to a first level of the reuse control signal, and the second selector outputs the input signal in response to a second level of the reuse control signal, and the reuse control signal is generated at the first level when the equalizer output signal has not converged to the predetermine value within a predetermined range.

5. The equalizer of claim 2, wherein the training sequence storage section is a register for storing the training sequence.

6. An equalizer, comprising:
an input signal reuse unit for outputting a training sequence stored during a training mode to a filter unit during a blind mode when an equalizer output signal has not converged to a predetermine value;
a filter unit for receiving an output signal of the input signal reuse unit and a decoder output signal, the filter unit capable of compensating for distortion in the input signal in response to an error signal and a decision value, the filter unit further capable of outputting a result of the compensation as the equalizer output signal;

an error calculation unit for receiving the equalizer output signal, the error calculation unit capable of estimating the equalizer output signal, the error calculation unit further capable of generating the estimate value as the decision value, the error calculation unit additionally capable of outputting a difference between the equalizer output signal and the decision value as the error signal; and a decoder for receiving the equalizer output signal and for outputting the decoder output signal by compensating for an error in the equalizer output signal, wherein the equalizer is configured to operate alternately in the training mode and the blind mode for a number of times smaller than a first adaptive number of loops and configured to initialize coefficients of the equalizer and operate in an input signal reuse mode for a number of times smaller than a second adaptive number of loops if the equalizer output signal is not converged after operating alternately in the training mode and the blind mode for the number of times smaller than the first adaptive number of loops.

7. The equalizer of claim 6, wherein the input signal reuse unit comprises:

a training sequence storage section for storing the training sequence of the input signal;

a first selector for selecting and outputting one of the input signal and the training sequence stored in the training sequence storage section in response to a field sync signal; and a second selector for selecting one of the input signal and an output signal of the first selector in response to a reuse control signal, the second selector capable of outputting the selected signal to the filter unit.

8. The equalizer of claim 7, wherein the first selector outputs the input signal in response to a first level of the field sync signal, and outputs the training sequence in response to a second level of the field sync signal.

9. The equalizer of claim 7, wherein the second selector outputs the output signal of the first selector in response to a first level of the reuse control signal, and outputs the input signal in response to a second level of the reuse control signal, and the reuse control signal is generated at the first level when the equalizer output signal has not converged to the predetermine value within a predetermined range.

10. The equalizer of claim 7, wherein the training sequence storage section is a register for storing the training sequence.

11. The equalizer of claim 6, wherein the filter unit comprises:

a feed forward filter for receiving the output signal of the input signal reuse unit, the feed forward filter capable of generating a first output signal by compensating for an error in the output signal of the input signal reuse unit in response to the error signal;

a feedback filter for receiving the decision value and the decoder output signal, the feedback filter capable of generating a second output signal by compensating for an error in the decision value, the feedback filter further capable of generating a third output signal by compensating for an error in the decoder output signal in response to the error signal;

a first operation unit for combining the second output signal with the third output signal to generate a fourth output signal; and a second operation unit for combining the first output signal with the fourth output signal to generate the equalizer output signal.

12. The equalizer of claim 11, wherein the feedback filter comprises:

a first feedback filter for receiving the decision value and for generating the second output signal in response to the error signal; and a second feedback filter for receiving the decoder output signal and for generating the third output signal in response to the error signal, wherein the first feedback filter receives the decision value and generates the second output signal until the decoder outputs the decoder output signal after receiving the equalizer output signal, and the second feedback filter receives the decoder output signal and generates the third output signal after the decoder outputs the decoder output signal.

13. The equalizer of claim 6, wherein the error calculation unit comprises:

a decision unit for receiving the equalizer output signal, the decision unit capable of estimating the equalizer output signal to a predetermined estimate value, and further capable of generating the estimate value as the decision value; and a third operation unit for outputting a difference between the equalizer output signal and the decision value as the error signal.

14. The equalizer of claim 6, wherein the decoder is a trellis coded modulation (TCM) decoder.

15. An equalizer, comprising:

a filter unit for receiving an input signal and a decoder output signal, the filter unit capable of compensating for distortion of the input signal in response to an error signal and a decision value, and the filter unit further capable of outputting the result of compensation as an equalizer output signal;

an error calculation unit for receiving the equalizer output signal, the error calculation unit capable of estimating the equalizer output signal, the error calculation unit further capable of generating an estimate value as the decision value, and for outputting a difference between the equalizer output signal and the decision value as the error signal; and a decoder for receiving the equalizer output signal and for outputting the decoder output signal by compensating for an error in the equalizer output signal, wherein the filter unit is configured to output the equalizer output signal in response to the decision value before the decoder outputs the decoder output signal, and the filter unit is configured to output the equalizer output signal in response to the decoder output signal after the decoder outputs the decoder output signal.

16. The equalizer of claim 15, wherein the filter unit comprises:

a feed forward filter for receiving the input signal and for generating a first output signal by compensating for an error in the input signal in response to the error signal;

a feedback filter for receiving the decision value and the decoder output signal, the feedback filter capable of generating a second output signal by compensating for an error in the decision value, the feedback filter further capable of generating a third output signal by compensating for an error in the decoder output signal in response to the error signal;

a first operation unit for combining the second output signal with the third output signal to generate a fourth output signal; and a second operation unit for combining the first output signal with the fourth output signal to generate the equalizer output signal.

17. The equalizer of claim 16, wherein the feedback filter comprises:

a first feedback filter for receiving the decision value and for generating the second output signal in response to the error signal; and a second feedback filter for receiving the decoder output signal and for generating the third output signal in response to the error signal, wherein the first feedback filter receives the decision value and generates the second output signal until the decoder outputs the decoder output signal after receiving the equalizer output signal, and the second feedback filter receives the decoder output signal and generates the third output signal after the decoder outputs the decoder output signal.

18. The equalizer of claim 15, wherein the error calculation unit comprises:

a decision unit for receiving the equalizer output signal, the decision unit capable of estimating the equalizer output signal to a predetermined estimate value, and capable of generating the estimate value as the decision value; and a third operation unit for outputting a difference between the equalizer output signal and the decision value as the error signal.

19. The equalizer of claim 15, wherein the decoder is a trellis coded modulation (TCM) decoder.

20. An equalization method, comprising:

(a) receiving an input signal for detecting a field sync signal and for initializing coefficients of an equalizer;

(b) alternately operating the equalizer in training and blind modes;

(c) determining whether an equalizer output signal from the equalizer has converged after (b) is performed for a predetermined number of times smaller than a first adaptive number of loops;

(d) executing (b) if it is determined that the equalizer output signal has converged, initializing the coefficients of the equalizer and operating the equalizer in an input signal reuse mode if it is determined that the equalizer output signal has not converged;

(e) determining whether the equalizer output signal of the equalizer has converged after the equalizer operates in the input signal reuse mode for a predetermined number of times smaller than a second adaptive number of loops; and (f) executing (b) if it is determined that the equalizer output signal has converged or executing (a) if it is determined that the equalizer output signal has not converged.

21. The equalization method of claim 20, wherein (f) includes applying the equalizer output signal to a decoder, compensating for an error in the equalizer output signal to generate a decoder output signal, feeding the decoder output signal back to a feedback filter within the equalizer, and returning to execute at least (b) if it is determined that the equalizer output signal has converged.

22. The equalization method of claim 20, wherein (d) includes storing the training sequence of the input signal in a predetermined register in response to a first level of the field sync signal and applying a training sequence and a data signal of an input signal to the equalizer to operate the equalizer while a reuse control signal is maintained at a second level; and applying the training sequence of the input signal stored in the register to the equalizer in response to a second level of the field sync signal to operate the equalizer while the reuse control signal is maintained at a first level.

23. The equalization method of claim 22, wherein the field sync signal is generated at the first level in the training mode of the input signal.

24. The equalization method of claim 22, wherein the reuse control signal is generated at the first level when the equalizer output signal is not converged within a predetermined range.

25. An equalization method, comprising:

(a) receiving an input signal for detecting a field sync signal and for initializing coefficients of the equalizer;

(b) alternately operating the equalizer in the training and blind modes;

(c) determining whether an equalizer output signal of the equalizer has converged after (b) is performed for a predetermined number of times smaller than a first adaptive number of loops; and (d) if it is determined that the equalizer output signal has converged, applying the equalizer output signal to a decoder, generating a decoder output signal by compensating for an error in the equalizer output signal, feeding the decoder output signal back to a feedback filter within the equalizer, and returning to (b), and if it is determined that the equalizer output signal has not converged, returning to (a), wherein the equalizer output signal is output in response to a decision value before the decoder output signal is output, and the equalizer output signal is output in response to the decoder output signal after the decoder outputs the decoder output signal.

26. An equalizer, comprising:

an input signal reuse unit for inputting a training sequence stored during a training mode to a filter unit during a blind mode when an equalizer output signal is not converged to a predetermined value;

a filter unit for receiving an output signal from the input signal reuse unit, the filter unit capable of compensating for distortion in the input signal in response to a error signal and a decision value, the filter unit further capable of outputting a result of the compensation as an equalizer output signal; and an error calculation unit for receiving the equalizer output signal, the error calculation unit capable of estimating the equalizer output signal, the error calculation unit capable of generating an estimate value as the decision value, the error calculation unit further capable of outputting a difference between the equalizer output signal and the decision value as the error signal, wherein the input signal reuse unit comprises:

a training sequence storage section for storing the training sequence of the input signal;

a first selector for selecting and outputting one of the input signal and the training sequence stored in the training sequence storage section in response to a field sync signal; and a second selector for selecting one of the input signal and an output signal of the first selector in response to a reuse control signal, the second selector capable of outputting the selected signal to the filter unit, and wherein the first selector outputs the input signal in response to a first level of the field sync signal, and the first selector outputs the training sequence in response to a second level of the field sync signal.

27. An equalizer, comprising:

a filter unit for receiving an input signal and a decoder output signal, the filter unit capable of compensating for distortion of the input signal in response to an error signal and a decision value, and the filter unit further capable of outputting the result of compensation as an equalizer output signal;

an error calculation unit for receiving the equalizer output signal, the error calculation unit capable of estimating the equalizer output signal, the error calculation unit further capable of generating an estimate value as the decision value, and for outputting a difference between the equalizer output signal and the decision value as the error signal; and a decoder for receiving the equalizer output signal and for outputting the decoder output signal by compensating for an error in the equalizer output signal, wherein the filter unit comprises:

a feed forward filter for receiving the input signal and for generating a first output signal by compensating for an error in the input signal in response to the error signal;

a feedback filter for receiving the decision value and the decoder output signal, the feedback filter capable of generating a second output signal by compensating for an error in the decision value, the feedback filter further capable of generating a third output signal by compensating for an error in the decoder output signal in response to the error signal;

a first operation unit for combining the second output signal with the third output signal to generate a fourth output signal; and a second operation unit for combining the first output signal with the fourth output signal to generate the equalizer output signal.

* * * * *